(No Model.) 4 Sheets—Sheet 2.
J. Q. ADAMS.
CORN SHELLER.
No. 599,759. Patented Mar. 1, 1898.
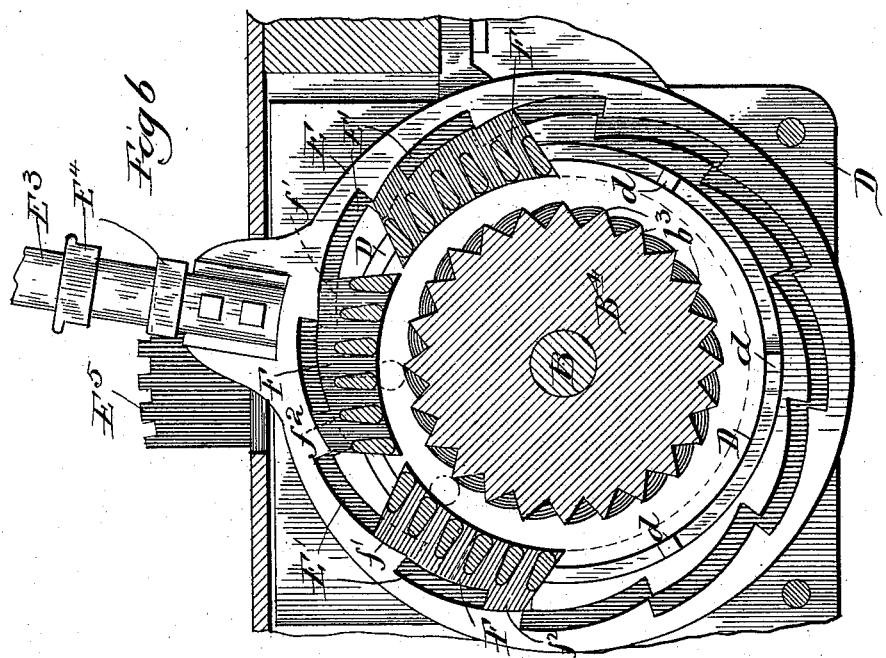
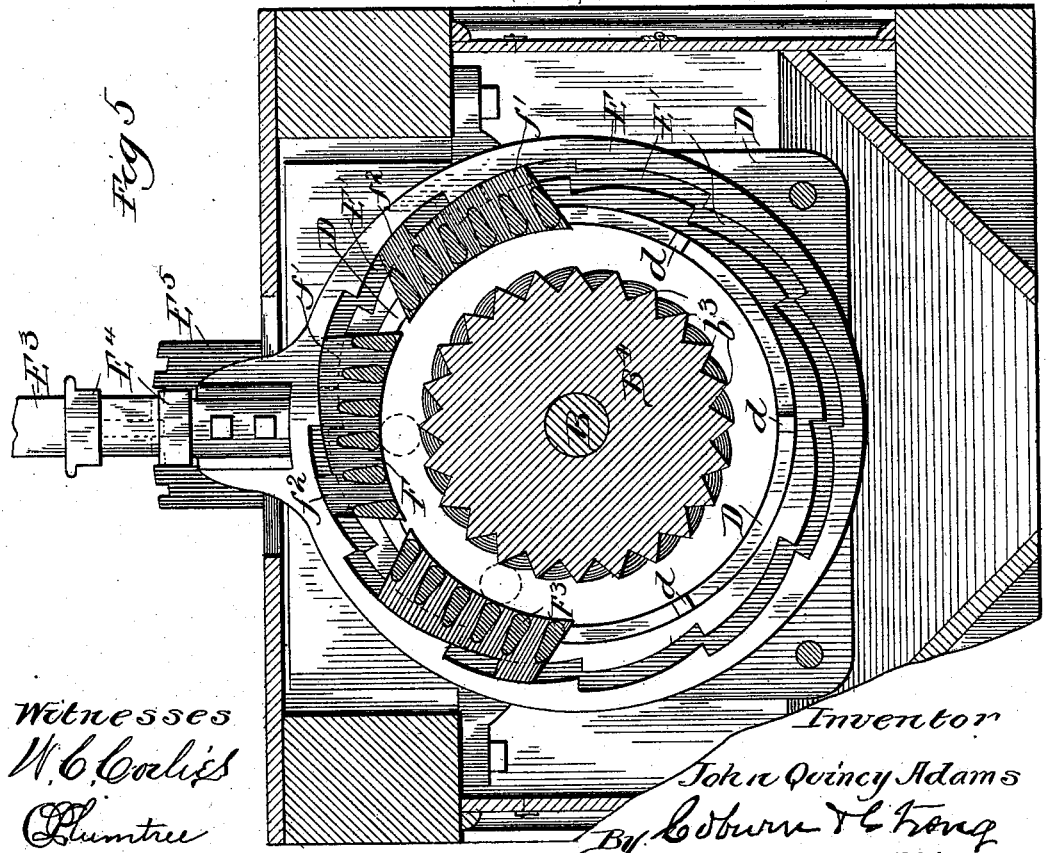
Witnesses
W. C. Corliss
Plumtree
Inventor
John Quincy Adams
By Coburn & Strong
Att'ys

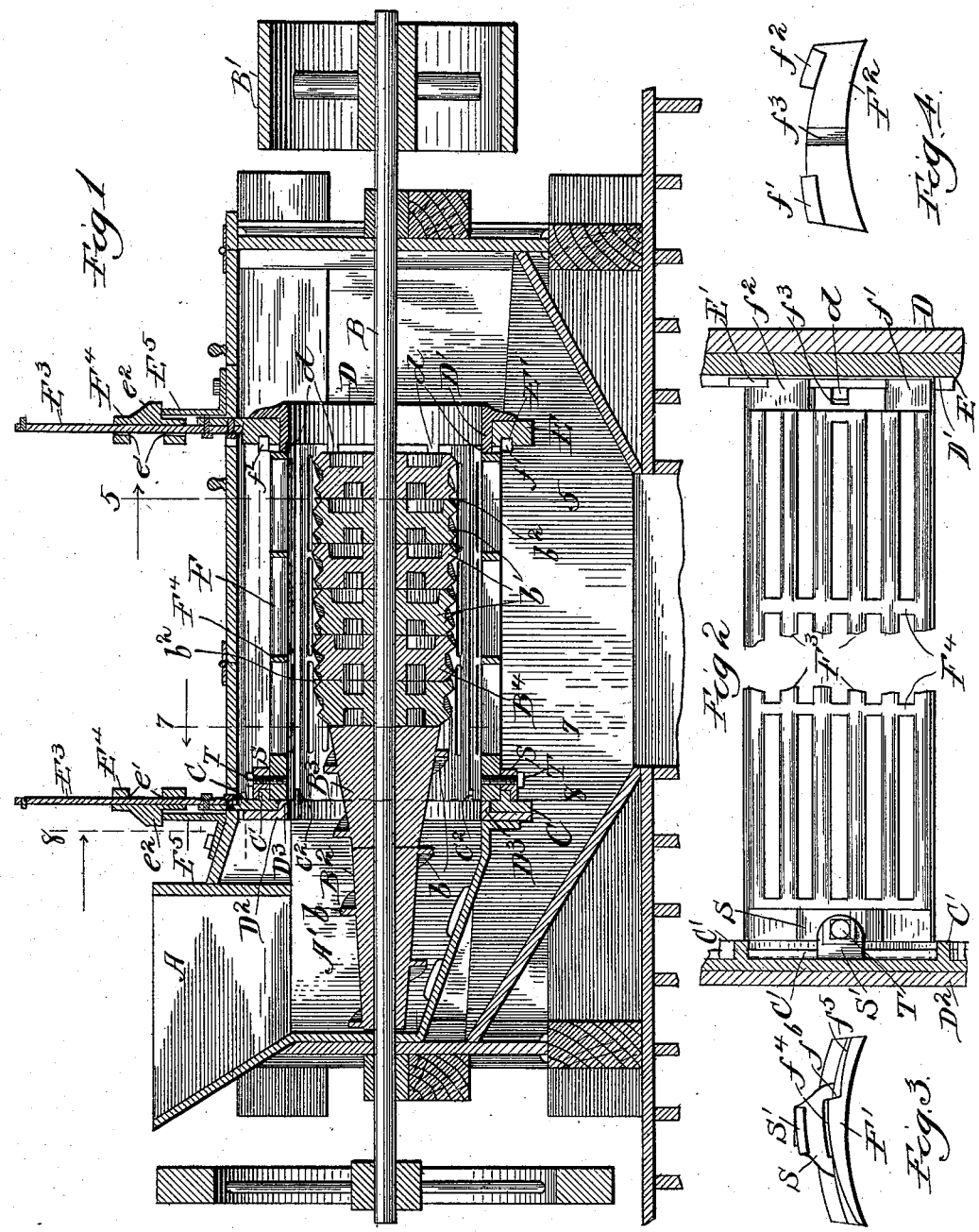

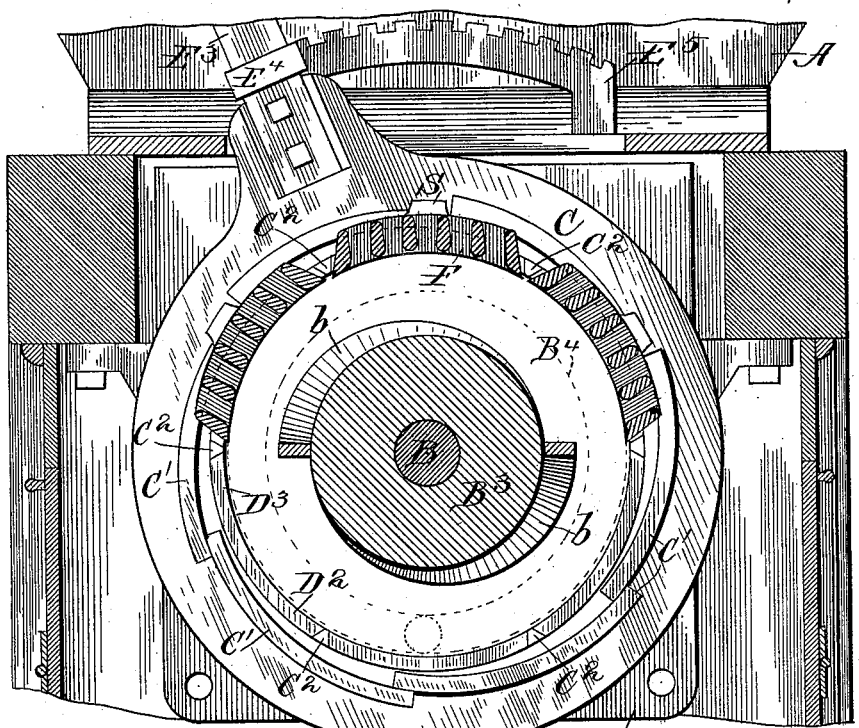
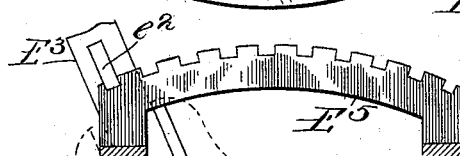
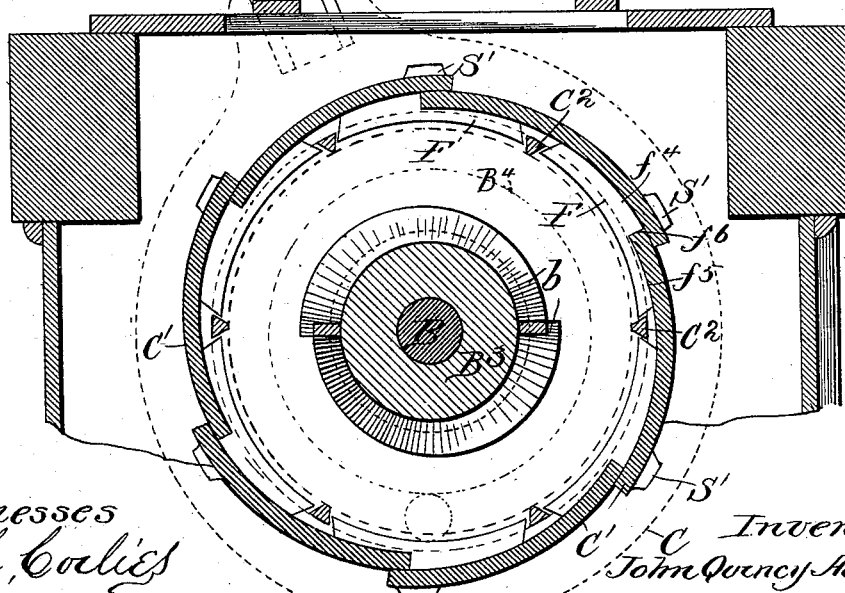

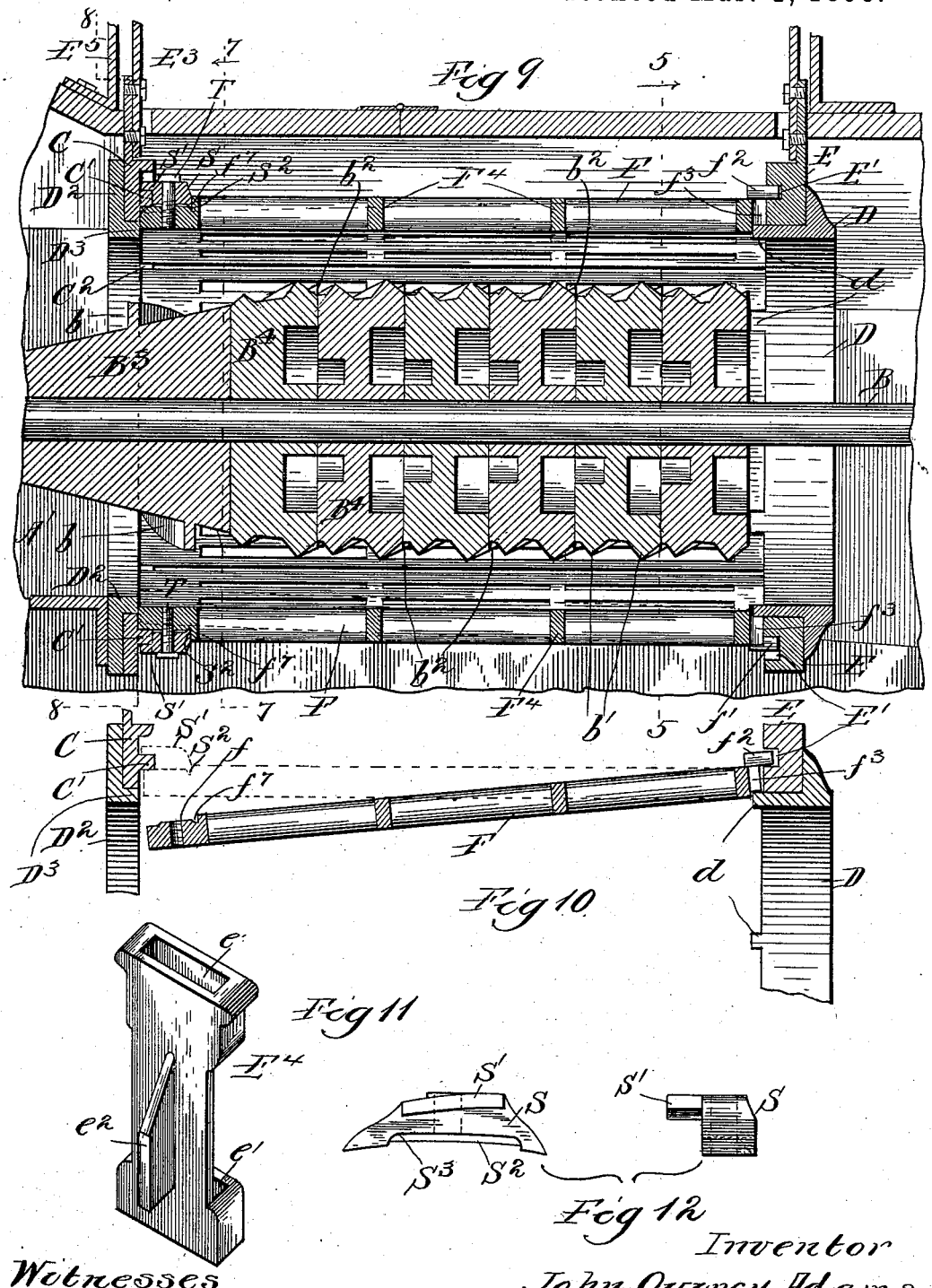

UNITED STATES PATENT OFFICE.

JOHN QUINCY ADAMS, OF MARSEILLES, ILLINOIS.

CORN-SHELLER.

SPECIFICATION forming part of Letters Patent No. 599,759, dated March 1, 1898.

Application filed June 1, 1897. Serial No. 639,011. (No model.)

*To all whom it may concern:*

Be it known that I, JOHN QUINCY ADAMS, a citizen of the United States, residing at Marseilles, in the county of La Salle and State of Illinois, have invented a certain new and useful Improvement in Corn-Shellers, which is fully set forth in the following specification, reference being had to the accompanying drawings, in which—

Figure 1 is a central section through the sheller. Fig. 2 is a plan view of one of the staves of the cylinder, showing its supporting and controlling rings in section. Figs. 3 and 4 are elevations of the left and right hand ends, respectively, of one of said staves. Fig. 5 is a vertical section on the line 5 5 of Fig. 1, showing that end of the cylinder adjusted at an intermediate position and with the lower staves removed to show more clearly the construction of the supporting and controlling rings. Fig. 6 is a view similar to Fig. 5, but with that end of the cylinder adjusted at its innermost position. Fig. 7 is a vertical section on the line 7 7 of Fig. 1, showing that end of the cylinder adjusted in its innermost position and with the lower staves removed, as in Figs. 5 and 6. Fig. 8 is a vertical section on the line 8 8 of Fig. 1, with that end of the cylinder adjusted at its outermost position. Fig. 9 is a section similar to Fig. 1, but on an enlarged scale and showing only the shelling mechanism proper. Fig. 10 is a detail view showing how the staves are removed from the cylinder. Fig. 11 is a perspective view of a novel catch which I employ in connection with the adjusting mechanism. Fig. 12 shows side and front elevations of a detachable lug on the left-hand end of each of the staves.

My invention relates to corn-shellers of the type in which a rotating cone is mounted within a cylinder, and has for its object certain improvements in the construction of said cylinder whereby it may be adjusted so as to give any desired distance between the walls of the cylinder and of the cone at any point. The object of this adjustability is to insure more perfect shelling, as different lots of corn may vary considerably in the size of their cobs and also in the degree of dampness of the corn. These differences would cause imperfect shelling if the machine were set for one particular kind of corn and could not be adjusted for any other. My improvements are designed to render the cylinder adjustable in any way that may be desired and in the shortest possible space of time. To this end I make the cylinder of a series of separate staves placed substantially parallel to the axis of the cone and control the ends of these staves by rings or otherwise, so that the ends of said staves may be moved radially at either or both ends of the machine, so as to obtain the required adjustment.

While I have illustrated a considerable portion of the complete mechanism of a modern corn-sheller, the features of this invention pertain to the construction of the cylinder and the means for adjusting it, and the description will be directed mainly to these features.

A represents the customary hopper, in which the ears of corn are supplied to the machine, and A' designates the feed-chamber, from which the ears are fed forward to the shelling mechanism proper. Extending throughout the length of the machine, and suitably mounted in the framework thereof, is journaled a shaft B, to which power is applied through a belt-pulley B' at one end thereof. Within the feed-chamber A' the shaft B carries an enlargement $B^2$, around the edge of which extends a helical flange $b$, which operates as a screw-feed to force the ears of corn into the shelling-cylinder. Within the shelling-cylinder the shaft B carries another conical enlargement or hub $B^3$, around which the helical flange $b$ is continued. Throughout the remainder of the length of the shelling-cylinder are mounted a series of cone-sections $b'$, disposed one behind the other, and all of which together constitute the shelling-cone proper, $B^4$. Each such section $b'$ is so shaped that its rear edge is of greater diameter than its front edge, and consequently projects beyond the edge of the section next adjacent, forming thereby a series of shoulders $b^2$. These sections of the shelling-cone are provided with helically-arranged V-shaped flanges $b^3$.

The shelling-cylinder inclosing the cone proper is constructed as follows: There is secured to the framework surrounding the opening from the feed-chamber to the shelling-cylinder a ring $D^2$, provided with the inwardly-projecting flange $D^3$. Opposite to this ring and separated from it by the length of the cylinder there is secured to the framework a second ring D, generally similar to the ring $D^2$ and provided with an inwardly-projecting flange D'. Upon the annulus formed by the flange $D^3$ is mounted an adjusting-ring C, while a somewhat similar adjusting-ring E is mounted upon the annulus formed by the flange D' at the other end of the cylinder. Between and supported by these rings C and E are mounted a series of staves F, which constitute the body of the shelling-cylinder. In the construction illustrated in the drawings I have shown the shelling-cylinder as composed of six staves F, each one consisting of the end pieces F' and $F^2$ (see Figs. 3 and 4) and of ribs $F^3$, (see Fig. 2,) mounted in and connecting the end pieces, which end pieces are approximately in the form of segments of a ring. These ribs are strengthened and braced apart by the cross-pieces $F^4$. In practice each of the staves, including the parts hitherto described and others to be subsequently mentioned as being integral therewith, is made as single casting. The connections between these staves F and their supporting-rings C and E will next be described.

Beginning at the right-hand end of the cylinder the adjusting-ring E, as best shown in Figs. 5 and 6, has upon its inner face a groove E', composed of twelve equal and symmetrical sections, each one of the shape of a portion of a circle, eccentric to the annulus E, as clearly shown in Figs. 5 and 6. The cooperating ends $F^2$ of the staves F, as shown in Fig. 4, are provided with lugs $f'$ and $f^2$, which take into adjacent sections of the groove E', as clearly seen. The staves F are maintained in their position parallel to the shaft B by the lugs $d$ on the flange D', which project into the grooves $f^3$, cut in the ends $F^2$ of the staves F. Taking the parts in the position shown in Fig. 6 it will be seen that the lugs $f'$ and $f^2$ are in the portions of the groove E' which are nearest to the shaft B, and that consequently the staves F have their ends brought as close to the shelling-cone as they possibly can be. When the annulus E is rotated to the left by means of its handle $E^3$, it will be seen that the curves of the groove E' will cam said lugs $f'$ and $f^2$ farther away from the cone, and they will be guided radially and kept in their proper position by reason of the lugs $d$ taking in the radial grooves $f^3$. In Fig. 5 the handle $E^3$ and the annulus E are shown in their intermediate position of adjustment. A similar mode of operation is obtained in connection with the left-hand end of the cylinder by somewhat different means.

Referring now especially to Figs. 7 and 8, the controlling-annulus C is provided with a series of six eccentrically-arranged cam-flanges C', which are similar in their shape and operation to the sections of the groove E'. These flanges C' cooperate with the surfaces $f^4$ of the end F' (see Fig. 3) of the stave F and the flange S' on the lug S, which is fastened to the end of the stave F by a screw-bolt T, as clearly shown in Fig. 9. The end F' of the stave F has the eccentric bearing-surface $f^4$, already referred to, and a similar bearing-surface $f^5$. These bearing-surfaces $f^4$ and $f^5$ are on different planes and are connected, as it were, by the shoulder $f^6$. The lug S (best shown in Fig. 12) has the flange S', whose under surface is substantially parallel to the bearing-surface $f^4$. This lug S has a recessed portion $S^3$, which fits over a corresponding raised portion $f$ on the end F' of the stave F, and the lug S is further provided with a downwardly-projecting flange $S^2$, which cooperates with a corresponding recess $f^7$ in the surface of the end F' of the stave F. This lug S, with its recesses and projections cooperating with corresponding projections and recesses on the end F' of the stave F, is firmly secured to said stave F by the screw-bolt T. When it is desired to remove one of the staves F, it is easily effected by removing the screw-bolt T and detaching the lug S, when the stave F can be dropped down into the position shown in Fig. 10 and drawn out between the ring $D^2$ and the conical portion $B^3$. The cam-flanges C' on the ring C cooperate with the bearing-surfaces $f^4$ and the flanges S' to move the ends F' of the stave F to or from the shaft B, as may be desired. These staves F are held from displacement laterally by means of the lugs $C^2$, projecting inwardly from the flanges $D^3$ and between the ends F', as clearly shown in Figs. 7 and 8. In Fig. 7 the ends F' of the staves F are shown in their innermost position, while in Fig. 8 they are shown in their outermost position with the annulus C (not shown) in its other extreme position and with the inner ends of the cam-flanges C' taking against the shoulders $f^6$ of the ends F' of the stave F. To hold these annuli C and E in their various positions of adjustment, I employ the notched segments $E^5$, and upon the handles $E^3$, which are bolted to the annuli, I mount the sliding catches $E^4$. (Best shown in Fig. 11.) These catches $E^4$ have the apertures $e'$, through which the handle passes, and the lug $e^2$, which takes into the notches of the segments $E^5$. It will be seen that when it is desired to shift the position of the annulus the handle $E^3$ will be grasped, and at the same motion the catch $E^4$ will be raised, so as to release the lug $e^2$ from its cooperating notch. The handle is then moved to the desired position and the catch $E^4$ allowed to drop, when it will engage with its notch and hold the parts firmly in the desired position.

In using the machine the operator will observe from the cobs delivered whether or not it is properly adjusted. If some of the corn remains on the cob, the failure to shell it properly may result from one of two causes. First, the machine may be set for a larger-sized cob than those of the particular lot of corn being shelled, and in this case there is too much space between the cone and the inner surface of the cylinder, which may be remedied by adjusting the delivery end of the cylinder to make it smaller, and consequently to decrease the distance between the cone and the inner surface of the cylinder. If necessary, the receiving end of the cylinder may also be reduced for this same purpose. If, on the other hand, the failure to shell perfectly results from the corn being too wet, the remedy is to reduce the speed with which the corn is fed through the machine by reducing the size of the receiving end of the cylinder, and consequently reducing the possible rapidity of the feed. On the other hand, if the cobs are being ground up too much it shows that the surface of the cylinder is set too close to the cone, and this fault of adjustment is remedied by increasing the diameter of either or both ends of the cylinder, as may be found desirable. It will be seen that these adjustments to remedy any of these defects may be made almost instantly and without stopping the machine and interfering at all with its operation.

It will be seen that I have by my invention produced a novel and extremely useful method of adjusting these machines, and that the mechanism employed is capable of some modifications, and that consequently I do not desire to be limited to the exact constructions employed.

I claim—

1. In a corn-shelling machine, the combination of a cylinder comprising the staves having the bearing-surface $f^4$ and the removable lug $S'$, with the annulus C having the cam-flanges $C'$ coöperating with said bearing-surface and said lug $S'$.

2. In a corn-shelling machine, the combination of the cylinder comprising the staves, with the annulus supporting said staves at one end, and the annulus C supporting said staves at the other end and secured thereto by the detachable lugs $S'$.

3. In a corn-shelling machine, the combination of the cylinder composed of the staves F, with the annulus supporting said staves at one end, the annulus C supporting said staves at the other end and carrying the cam-flanges $C'$, and the detachable lugs $S'$ carried by the ends $F'$ of said staves and together with the bearing-surface $f^4$ coöperating with said flanges $C'$, substantially as and for the purpose described.

4. In a corn-shelling machine, the combination of the staves F supported at one end, with the cam-ring having connections with the other end of said staves for moving them radially, and the fixed lugs $d$ coöperating with the radial slots $f^3$ in said staves.

5. In a corn-shelling machine, the combination of the staves F supported at one end, with the cam-ring C carrying the cam-flanges $C'$ coöperating with the bearing-surface $f^4$ and the lug $S'$ on one end of said staves, and the fixed lugs $d$ coöperating with the radial slots $f^3$ in the same end of said staves.

6. In a corn-shelling machine, the combination of the staves F, each having the lugs $f'$ and $f^2$ at one end and the groove formed by the bearing-surface $f^4$ and the lug $S'$ at the other end, and movable supports coöperating with the lugs and grooves at their respective ends to adjust said staves, substantially as and for the purpose described.

JOHN QUINCY ADAMS.

Witnesses:
 A. T. ADAMS,
 AUGUSTUS ADAMS.